United States Patent [19]

Meijburg

[11] Patent Number: 5,246,062
[45] Date of Patent: Sep. 21, 1993

[54] DEVICE FOR HEATING A SUBSTANCE IN THROUGH-FLOW

[75] Inventor: Cornelis Meijburg, Hendrik Ido Ambacht, Netherlands

[73] Assignee: Vomatec B.V., Ridderkerk, Netherlands

[21] Appl. No.: 911,777

[22] Filed: Jul. 10, 1992

[30] Foreign Application Priority Data

Jul. 11, 1991 [NL] Netherlands ............... 9101227

[51] Int. Cl.⁵ ............................................... F28F 27/02
[52] U.S. Cl. ...................................... 165/100; 165/145; 165/158
[58] Field of Search ................... 165/101–103, 165/157, 158, 145, 100

[56] References Cited

U.S. PATENT DOCUMENTS

| | | | |
|---|---|---|---|
| 2,083,679 | 6/1937 | Adams | 165/158 X |
| 2,316,063 | 4/1943 | Gunter | 165/82 |
| 3,587,732 | 6/1971 | Burne | 165/158 |
| 3,800,867 | 4/1974 | MacKenzie | 165/158 |
| 3,880,226 | 4/1975 | Houser | 165/11.1 |
| 4,747,449 | 5/1988 | Nickell | 165/134.1 |

FOREIGN PATENT DOCUMENTS

| | | |
|---|---|---|
| 8600655 | 10/1987 | Netherlands. |
| WO9100980 | 1/1991 | PCT Int'l Appl. . |
| 430347 | 6/1935 | United Kingdom. |

Primary Examiner—Allen J. Flanigan
Attorney, Agent, or Firm—Handal & Morofsky

[57] ABSTRACT

Device for heating a substance in through-flow, comprising a closed housing (1) and a number of straight channels (8) extending between two plate-shaped elements (2, 3), each provided with apertures (6, 7) in which the ends of the channels are mounted, and which are covered by a cover plate (9, 10) in which recesses (11, 12) are disposed, forming connections between the pairs of apertures (6, 7), while an aperture (18) is provided in a cover plate (10), which aperture runs through said cover plate and can be connected to the feed pipe (16) for the substance to be treated, and a valve element (19) is fitted in the cover plate (10), by means of which element the connection between the aperture (18) and the aperture (7) in the plate-shaped element lying upstream thereof can be blocked. A channel can be formed by a number of pipe sections running parallel to each other and each mounted in a member disposed in one of the apertures in the plate-shaped element.

5 Claims, 2 Drawing Sheets

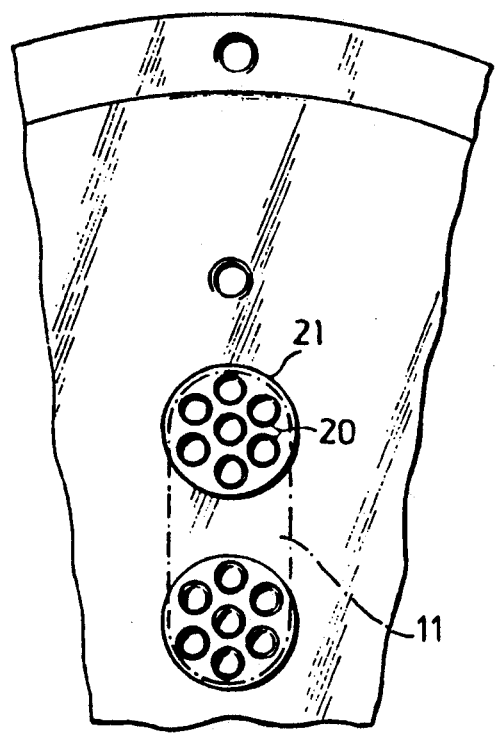
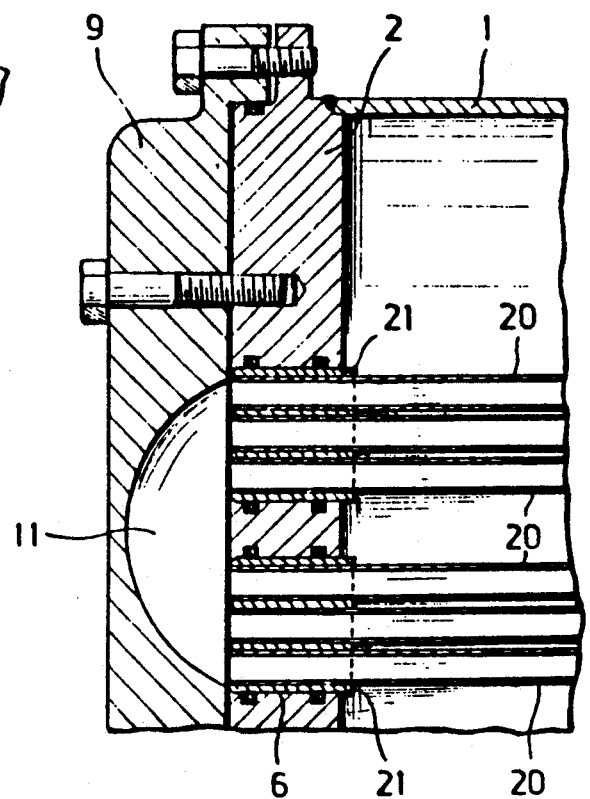
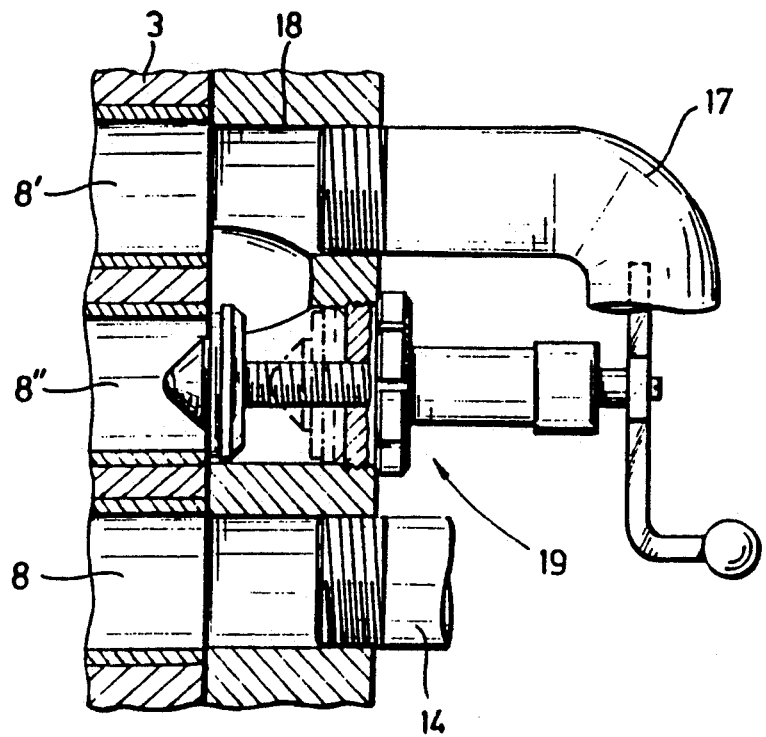

DEVICE FOR HEATING A SUBSTANCE IN THROUGH-FLOW

The invention relates to a device for heating a substance or a mixture of substances in through-flow, in particular for boiling a raw material for the preparation of a confectionery product or similar delicacy food product, comprising a closed housing which is provided with at least one feed pipe and one discharge pipe for a heating medium, for example steam, and a pipe which extends through the inside of said housing and is formed by a number of straight channels running essentially parallel to each other and extending through the housing between two plate-shaped elements which are each provided with a number of apertures in which the ends of the channels are mounted, each plate-shaped element at its outside being covered by a cover plate, and a connection being formed between pairs of said apertures in such a way that the channels are interconnected to a pipe running to and fro through the housing, said pipe having a feed and discharge end running to the outside of the housing. Such a device in known from Dutch Patent Application 8,600,655.

In the case of the known device the connections between the pairs of apertures are formed by channel-shaped recesses formed in the outer face of the plate-shaped elements and extending between two apertures, the open sides of which are covered by the cover plates.

According to the invention, it has now been realised that the serviceability of the device of the abovementioned type can be improved in a simple way if the connections between the pairs of apertures are formed by recesses provided in the inward-facing surface of the cover plate.

Users of a device for heating a substance in through-flow often need to be able to work at a lower capacity at certain moments, something which is not possible with the device which is available, which is designed for a certain large capacity. The purchase of a separate device with a lower capacity is, however, often not justified, with the result that these users are faced with a great problem.

According to the invention, a solution is found to this problem in that provision is made in at least one of the cover plates for at least one aperture which runs through it from the outside, and on the inside is connected to one of the apertures containing a channel in the plate-shaped element covered by the cover plate, while said aperture at the outside can be connected to the feed pipe for the substance to be treated, and a valve element is fitted in the cover plate, by means of which the connection between the abovementioned aperture and the aperture lying upstream thereof in the plate-shaped element can be blocked.

The abovementioned feed end is in this case connected in an advantageous manner to one of the discharge branches of a three-way valve, of which the other discharge branch is connected to said aperture in one of the cover plates.

In the case of a device designed in this way, the capacity of the device can be reduced if desired simply by diverting the supply of the substance to be treated by means of the three-way valve to said aperture in the cover plate and placing the valve element in the shutting-off position, so that the part of the through pipe extending through the housing and lying upstream of said valve element is put out of action, and only the remaining part of said pipe is operational. The capacity of the device can be reduced to, for example, half by making a suitable selection of the positioning of the connecting aperture and the valve element in the cover plate.

It is also possible in an advantageous way according to the invention to form each channel by a number or a bundle of pipe sections which run parallel to each other and are each mounted at both ends in a continuous aperture in an element which is mounted in one of the apertures in the plate-shaped element concerned. This means that a large heated surface with a considerably shorter channel length can be obtained with a relatively small capacity of the device.

The invention is described in greater detail with reference to the drawing, in which:

FIG. 3 shows the valve element on a larger scale;

FIGS. 4a and 4b show a part of the device according to the invention, in which each channel is formed by a number of pipe sections.

Figure 1:
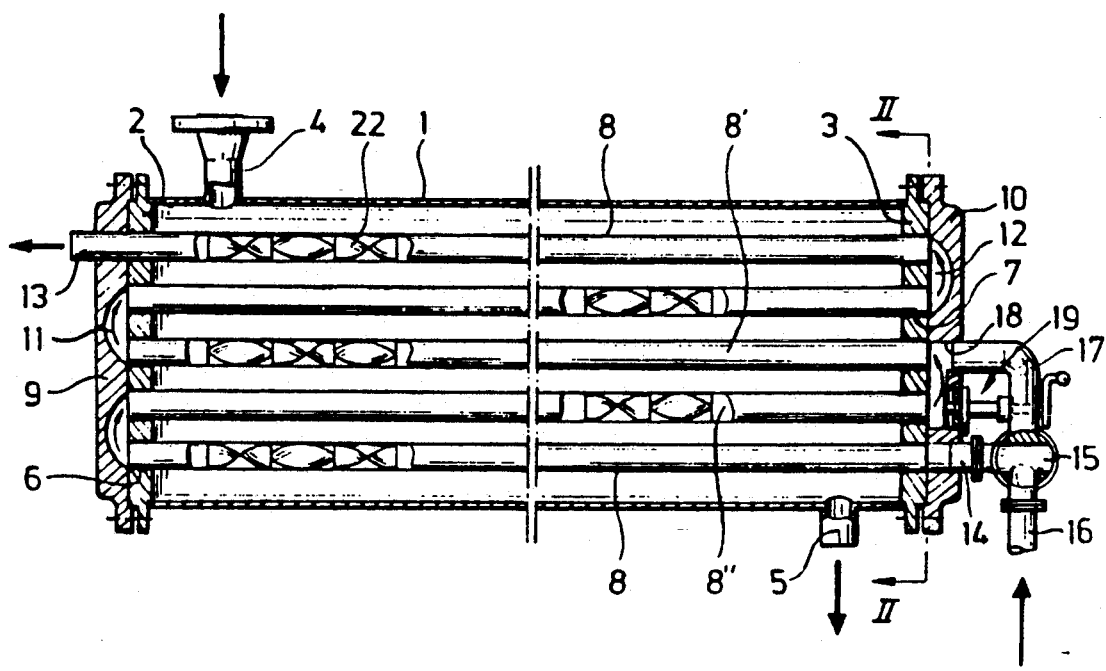
FIG. 1 shows a device according to the invention in longitudinal section.
Figure 2:
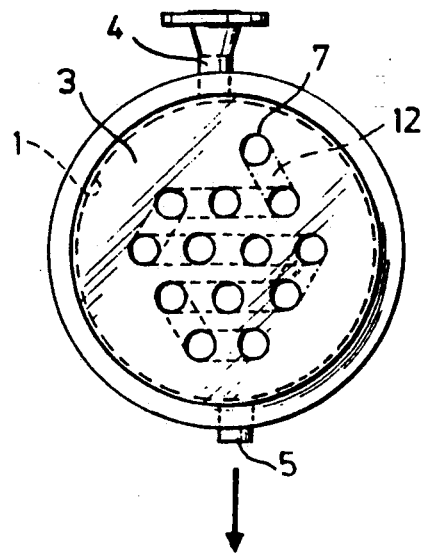
FIG. 2 shows a side view of the device along line II—II in FIG. 1.

As shown in FIGS. 1 and 2, the device comprises a housing formed by a cylindrical casing 1, which is shut off at both ends by a plate 2, 3. The casing 1 is provided with an inlet 4 for feeding a heating medium, in particular steam, into the housing, and with an outlet 5 for the discharge of said medium. The plates 2 and 3 are provided with a number of apertures 6, 7 in which the ends of the straight pipe sections 8 are mounted, which pipe sections have a number of stationary mixing elements 22. The plates 2 and 3 are covered by the cover plates 9, 10 respectively, in which recesses 11, 12 are disposed, in each case forming a connection between pairs of apertures 6, 7 in such a way that the pipe sections 8 are interconnected to form one pipe extending to and fro through the housing 1, 2. One of the ends of a pipe section 8 is connected to an outlet for the substance to be treated, projecting to the outside of the housing 1, 2, while another pipe section 8 is connected to an inlet 14 for the substance to be treated, projecting to the outside of the housing 1, 2. Said inlet 14 is connected to one of the discharge branches of a three-way valve 15, by means of which the inlet 14 can be connected to the feed pipe 16 for the substance to be treated. The other discharge branch 17 of the three-way valve 15 is connected to an aperture 18 provided in the cover plate 10 and itself connected to a pipe section 8'. The cover plate 10 also has in it a valve element 19, by means of which the connection between said pipe section 8' and the pipe section 8" lying upstream thereof can be blocked, as shown in FIG. 3. When, therefore, the valve element 19 is placed in the shutting-off position and the three-way valve 15 is turned in such a way that the feed of the substance to be treated flows in through the aperture 18, only the pipe section 8' and the pipe sections 8 lying downstream thereof are operational, with the result that the capacity of the device is correspondingly reduced.

In the embodiment shown in FIG. 4 the pipe sections 8 with the stationary mixing elements placed in them are replaced by a number or a bundle of pipe sections 20 running parallel to each other, and mounted at both ends in a through aperture in an element 21 which is mounted in an aperture 6, 7 in the plate-shaped element 2, 3 concerned.

I claim:

1. A device for heating a substance or a mixture of substances in through-flow, in particular for boiling a raw material for the preparation of a confectionery product or similar luxury food product, said device comprising:
   a) a closed housing;
   b) at least one feed pipe for a heating fluid;
   c) at least one discharge pipe for said heating fluid;
   d) two plate-shaped end elements each having a plurality of end-element apertures;
   e) two outside cover plates, each having an inward-facing surface, and each covering one said end element;
   f) a number of straight pipe sections running essentially parallel to each other and extending internally through said housing, between said plate-shaped elements, said pipe sections each having ends and said pipe section ends being mounted in said end-element apertures;
   g) recesses in said inward-facing surface of each said cover plate, said recesses providing flow path connections between pairs of said apertures in such manner that said pipe sections are interconnected at said ends to form a single, multiple pass flow path in said housing, said flow path extending between said feed and discharge means;
   h) an externally communicating aperture in at least one said cover plate for connection to a feed pipe for said substance to be heated; and
   i) a valve element carried by said apertured cover plate;

wherein said valve element is movable to block one of said connections between a pair of said end-element apertures to reduce the capacity of said device.

2. A device according to claim 1, further comprising a three-way valve having two discharge branches, wherein said feed pipe is connected to one of said discharge branches of said three-way valve, and the other discharge branch is connected to said externally communicating cover plates aperture.

3. A device according to claim 1 wherein each said pipe section comprises a bundle of pipe sub-sections running essentially parallel to one another, said pipe sub-sections of a bundle constituting each pipe section having two subsection ends both said sub-section ends being mounted in a tubular element said tubular element being mounted in one of said end-element apertures.

4. A device according to claim 2 wherein each said pipe section comprises a bundle of pipe sub-sections running essentially parallel to one another, said pipe sub-sections of a bundle constituting each pipe section having two subsection ends both said sub-section ends being mounted in a tubular element said tubular element being mounted in one of said end-element apertures.

5. A device for heating a substance or a mixture of substances in through-flow, in particular for boiling a raw material for the preparation of a confectionery product or similar luxury food product, said device comprising:
   a) a closed housing;
   b) at least one feed pipe for a heating fluid;
   c) at least one discharge pipe for said heating fluid;
   d) two plate-shaped end elements each having a plurality of end-element apertures;
   e) two outside cover plates, each having an inward-facing surface, and each covering one said end element;
   f) a number of straight pipe sections running essentially parallel to each other and extending internally through said housing, between said plate-shaped elements, said pipe sections each having ends and said pipe section ends being mounted in said end-element apertures;
   g) recesses in said inward-facing surface of each said cover plate, said recesses providing flow path connections between pairs of said apertures in such manner that said pipe sections are interconnected at said ends to form a single, multiple pass flow path in said housing, said flow path extending between said feed and discharge means; and
   h) an externally communicating aperture in at least one said cover plate for connection to a feed pipe for said substance to be heated;

wherein each said pipe section comprises a bundle of pipe sub-sections running essentially parallel to one another, said pipe sub-sections of a bundle constituting each pipe section having two subsection ends both said sub-section ends being mounted in a tubular element said tubular element being mounted in one of said end-element apertures.

* * * * *